US012609831B2

(12) United States Patent
Hemantharaja

(10) Patent No.: US 12,609,831 B2
(45) Date of Patent: Apr. 21, 2026

(54) SYSTEMS AND METHODS FOR OBJECT DETECTION IN AUTONOMOUS VEHICLES

(71) Applicant: Harman International Industries, Incorporated, Stamford, CT (US)

(72) Inventor: Sharath Yadav Doddamane Hemantharaja, Chitradurga (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 316 days.

(21) Appl. No.: 18/041,788

(22) PCT Filed: Sep. 30, 2020

(86) PCT No.: PCT/US2020/053484
§ 371 (c)(1),
(2) Date: Feb. 15, 2023

(87) PCT Pub. No.: WO2022/039765
PCT Pub. Date: Feb. 24, 2022

(65) Prior Publication Data
US 2024/0010226 A1     Jan. 11, 2024

(30) Foreign Application Priority Data

Aug. 17, 2020     (IN) ............................. 202041035296

(51) Int. Cl.
*G06F 21/55*          (2013.01)
*H04L 9/32*           (2006.01)

(52) U.S. Cl.
CPC ................................. *H04L 9/3247* (2013.01)

(58) Field of Classification Search
CPC ..... H04L 9/3247; G06F 21/44; G06F 21/564; G06F 21/64; B60R 25/04
(Continued)

(56) References Cited

U.S. PATENT DOCUMENTS

| | | | |
|---|---|---|---|
| 7,877,610 B2 * | 1/2011 | Vanstone | .............. H04L 9/3252 |
| | | | 713/168 |
| 11,329,983 B2 * | 5/2022 | Mondello | ............. H04L 9/0894 |

(Continued)

OTHER PUBLICATIONS

Redmon, J. et al., "You Only Look Once: Unified, Real-Time Object Detection," ArXiv Cornell University Website, Available Online at https://arxiv.org/abs/1506.02640, Available as Early as Jun. 8, 2015, Last Revised May 9, 2016, 10 pages.
(Continued)

*Primary Examiner* — Taghi T Arani
*Assistant Examiner* — Pegah Barzegar
(74) *Attorney, Agent, or Firm* — McCoy Russell LLP

(57)                    ABSTRACT

Embodiments are disclosed for reducing unauthorized modifications of object detection systems of motor vehicles. As an example, a method comprises: generating a cryptographic signature for an output of nodes of a fully connected layer of a neural network of an object detection system of a vehicle, the cryptographic signature based in part on a first private key stored in a reply-protected memory block (RPMB), the output at least partially describing a detected object; and, responsive to verifying the cryptographic signature, adjusting vehicle operation based on the detected object. In this way, outputs of the neural network may be verified, so that unauthorized modifications are detected, and system accuracy increases.

15 Claims, 9 Drawing Sheets

(58) Field of Classification Search
USPC .......................................................... 380/59
See application file for complete search history.

(56)                    References Cited

U.S. PATENT DOCUMENTS

| | | | | |
|---|---|---|---|---|
| 2007/0034687 | A1* | 2/2007 | Numao ................. | H04L 9/3247 |
| | | | | 235/380 |
| 2014/0250290 | A1* | 9/2014 | Stahl ..................... | H04L 9/3247 |
| | | | | 713/2 |
| 2016/0048688 | A1* | 2/2016 | Flynn .................. | G06F 21/6281 |
| | | | | 713/193 |
| 2016/0379015 | A1* | 12/2016 | Samsonov .............. | G06F 21/64 |
| | | | | 713/193 |
| 2017/0230176 | A1* | 8/2017 | Princen ................. | H04L 9/0894 |
| 2017/0232300 | A1* | 8/2017 | Tran ........................ | G06F 1/163 |
| | | | | 434/247 |
| 2018/0295546 | A1* | 10/2018 | Crawford ................ | H04L 67/10 |
| 2019/0044729 | A1 | 2/2019 | Chhabra et al. | |
| 2019/0163913 | A1 | 5/2019 | Sun | |
| 2019/0171385 | A1* | 6/2019 | Caraccio .............. | G11C 14/009 |
| 2020/0159930 | A1* | 5/2020 | Venkateswaran ..... | H04L 9/3247 |
| 2020/0159931 | A1* | 5/2020 | Schutt .................... | G06F 21/64 |
| 2020/0175334 | A1* | 6/2020 | Zhang .................. | G06F 18/217 |
| 2020/0210596 | A1* | 7/2020 | Cariello .................. | G06F 21/79 |
| 2020/0219009 | A1* | 7/2020 | Dao ....................... | H04L 9/3247 |
| 2020/0264864 | A1* | 8/2020 | Yang ..................... | H04L 9/3247 |
| 2020/0314096 | A1* | 10/2020 | Mondello ............. | H04L 9/3236 |
| 2020/0396080 | A1* | 12/2020 | Yoo ....................... | H04L 9/0631 |
| 2021/0223780 | A1* | 7/2021 | Bramley ................ | G06V 20/56 |
| 2021/0264777 | A1* | 8/2021 | Jannink ................ | G08G 1/0175 |
| 2021/0326967 | A1* | 10/2021 | Geekee ............. | G06Q 30/0202 |
| 2021/0334016 | A1* | 10/2021 | Jean ....................... | G06F 3/0679 |
| 2021/0350028 | A1* | 11/2021 | Yu .......................... | H04L 9/0643 |
| 2022/0022030 | A1* | 1/2022 | Kumar ................ | H04L 63/0442 |
| 2022/0126864 | A1* | 4/2022 | Moustafa .......... | B60W 60/0013 |
| 2023/0100728 | A1* | 3/2023 | Li ........................... | G06V 10/20 |
| | | | | 382/157 |
| 2023/0141210 | A1* | 5/2023 | Belgarric ............. | G06N 3/0499 |
| | | | | 706/27 |
| 2024/0010226 | A1* | 1/2024 | Hemantharaja ....... | H04L 9/3247 |

OTHER PUBLICATIONS

European Patent Office, Extended European Search Report Issued in
Application No. 20950471.1, Aug. 5, 2024, Germany, 11 pages.
Tyagi, A. et al., "Providing Trust Enabled Services in Vehicular
Cloud Computing," Proceedings of the International Conference on
Informatics and Analytics, Aug. 25, 2016, Pondicherry, India, 10
pages.
Chowdhury, M. et al., "Secure Information Sharing among Autono-
mous Vehicles in NDN," Proceedings of the 2017 IEEE/ACM
Second International Conference on Internet-of-Things Design and
Implementation (IoTDI), Apr. 18, 2017, Pittsburgh, Pennsylvania,
11 pages.
Wood, R., "Secure Device Provisioning Best Practices: Heavy
Truck Edition," NCC Group Website, Retrieved from https://www.
nccgroup.com/globalassets/US-web-images/nick/secure-device-
provisioning.pdf>, Dec. 31, 2019, 39 pages.
ISA United States Patent and Trademark Office, International Search
Report and Written Opinion Issued in Application No. PCT/US2020/
053484, Feb. 12, 2021, WIPO, 13 pages.

* cited by examiner

START

802

INPUT VIDEO FRAME/IMAGE (I) TO YOLO ALGORITHM

804

PROCESS FRAME/IMAGE (I) VIA CONVOLUTIONAL AND POOLING LAYERS (SEE FIG. 7)

806

GENERATE SIGNED LOCALIZED OUTPUT AND SIGNED/ ENCRYPTED CLASSIFIED OUTPUT (SEE FIG. 7)

808

APPLY THRESHOLDING TO REMOVE UNWANTED BOUNDING BOXES

810

VERIFY SIGNED LOCALIZED OUTPUT AND ENCRYPTED AND SIGNED CLASSIFIED OUTPUT (SEE FIG. 9)

END

SYSTEMS AND METHODS FOR OBJECT DETECTION IN AUTONOMOUS VEHICLES

CROSS-REFERENCE TO RELATED APPLICATIONS

The present application is a U.S. National Phase of International Application No. PCT/US2020/053484, entitled "SYSTEMS AND METHODS FOR OBJECT DETECTION IN AUTONOMOUS VEHICLES", filed on Sep. 30, 2020. International Application No. PCT/US2020/053484 claims priority to Indian Patent Application number 202041035296, entitled "SYSTEMS AND METHODS FOR OBJECT DETECTION IN AUTONOMOUS VEHICLES", and filed on Aug. 17, 2020. The entire contents of the above-listed application is hereby incorporated by reference for all purposes.

FIELD

The disclosure relates to the field of autonomous (e.g., self-driving) vehicles.

BACKGROUND

Some motor vehicles may include systems for environmental perception and object detection. For example, a vehicle may include an object detection system for detecting objects surrounding the vehicle, such as in order to adjust vehicle operation. In particular, the object detection system may include a neural network for identifying and classifying objects in camera images. For example, the vehicle may include cameras and other sensors, such as Lidar, radars, and the like, and a neural network for processing camera images in order to detect objects. Driver assistance systems (e.g., such as a collision avoidance system, a lane change warning system, a cruise control system, and the like) and autonomous driving systems may use results of the object detection system to adjust vehicle operation. As an example, a planned vehicle trajectory may be adjusted based on an object detected by the object detection system. Further, the type of adjustment may depend on a type of object detection. For example, a vehicle may be adjusted differently in response to detecting a pedestrian in the road, relative to detecting a vehicle in the road. However, in some examples, results of an object detection system may be modified by an unauthorized entity. For example, an unauthorized modification may adjust results of the object detection system, and the vehicle controls may be adjusted based on the unauthorized modification. As such, an accuracy of the object detection system may be decreased, and customer satisfaction with vehicle operation may be decreased. Further, the safety of the autonomous vehicles may be compromised.

SUMMARY

Embodiments are disclosed for a method comprising generating a cryptographic signature for an output of nodes of a fully connected layer of a neural network of an object detection system of a vehicle, the cryptographic signature based in part on a first private key stored in a reply-protected memory block (RPMB), the output at least partially describing a detected object; and responsive to verifying the cryptographic signature, adjusting vehicle operation based on the detected object. In this way, unauthorized modification of an object detection system may be decreased. For example, by using a cryptographic mechanism to cryptographically sign outputs of nodes of a fully connected layer of a neural network of the object detection system. Further, by verifying the cryptographically signed output of the object detection system, unauthorized modifications may be detected. For example, an unauthorized entity may not generate authentic cryptographic signatures. As such, outputs of the object detection system with unverified cryptographic signatures may be determined to be modified. By reducing an incidence of unauthorized modification of outputs of an object detection system, vehicle performance (particularly in terms of safety) may be increased, and overall customer satisfaction may be increased.

In another embodiment, a method comprises: inputting, at a vehicle, a camera image to a neural network of an object detection system of the vehicle, the neural network including a fully connected layer; signing a first output of nodes of the fully connected layer with a first cryptographic signature; signing a second output of nodes of the fully connected layer with a second cryptographic signature; processing each of the first output and the second output via an activation function, the output of the activation function including a localized output signed with the first cryptographic signature and a classified output signed with the second cryptographic signature, each of the localized output and the classified output at least partially describing a detected object; verifying each of the first cryptographic signature and the second cryptographic signature based on at least one public key and at least one private key; and, responsive to successfully verifying each of the first cryptographic signature and the second cryptographic signature, adjusting at least one vehicle control based on each of the localized output and the classified output.

In another embodiment, a system comprises: a vehicle system; a vehicle control system including at least one of an autonomous vehicle control system and a driver assistance system; a plurality of sensors communicatively coupled to the vehicle control system, the plurality of sensors including at least one camera; an object detection system including a neural network, the neural network taking camera images from the at least one camera as an input, and generating output coordinates corresponding to a bounding box of a detected object and its object classification as an output; a controller storing executable instructions in non-transitory memory that, when executed, cause the controller to: responsive to verifying a cryptographic signature of an output of the neural network, adjust at least one of the autonomous vehicle control system and the driver assistance system based on the output, the cryptographic signature generated at a fully connected layer of the neural network.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined distinctly by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 3 shows a data flow for an object detection system in accordance with one or more embodiments of the present disclosure;

DETAILED DESCRIPTION

Figure 5:
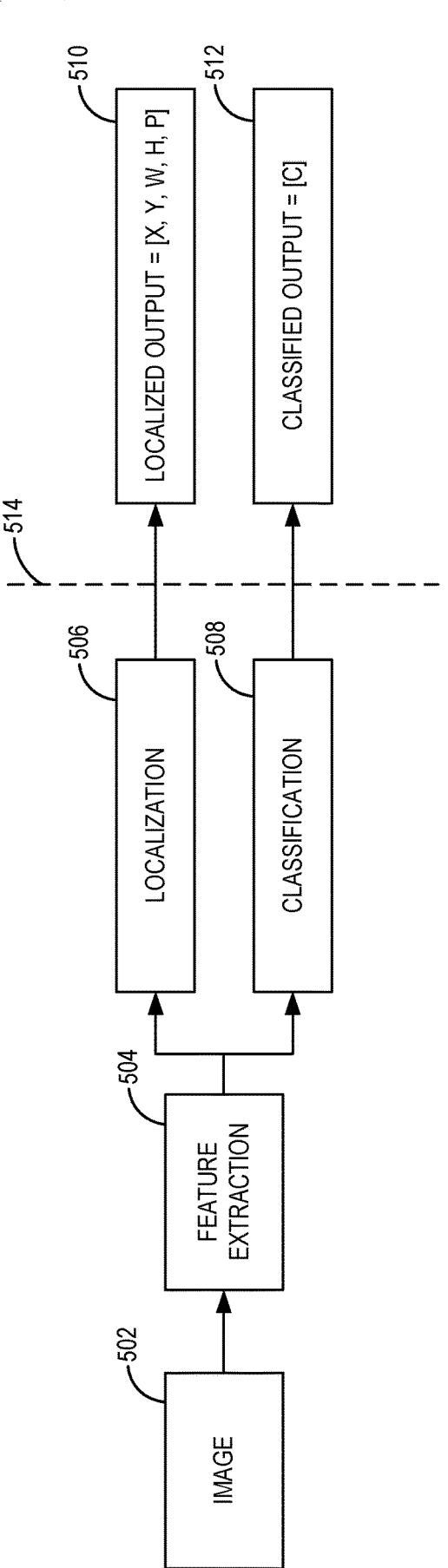
FIG. 5 shows an example of an existing neural network for object detection in an object detection system in accordance with one or more embodiments of the present disclosure.
Figure 6:
FIG. 6 shows example unauthorized modifications of results of an object detection system in accordance with one or more embodiments of the present disclosure.
Figure 6:
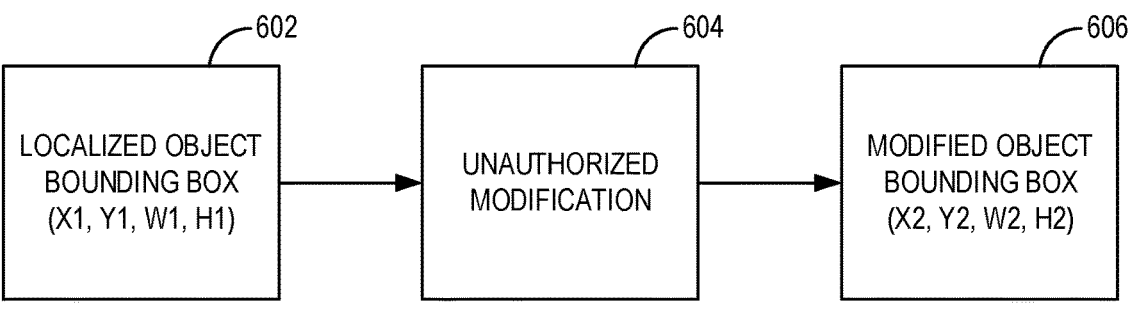
Figure 6:
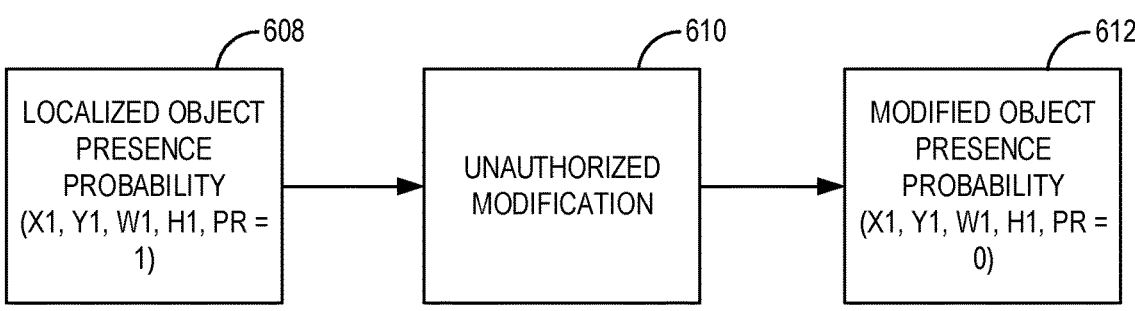
Figure 6:
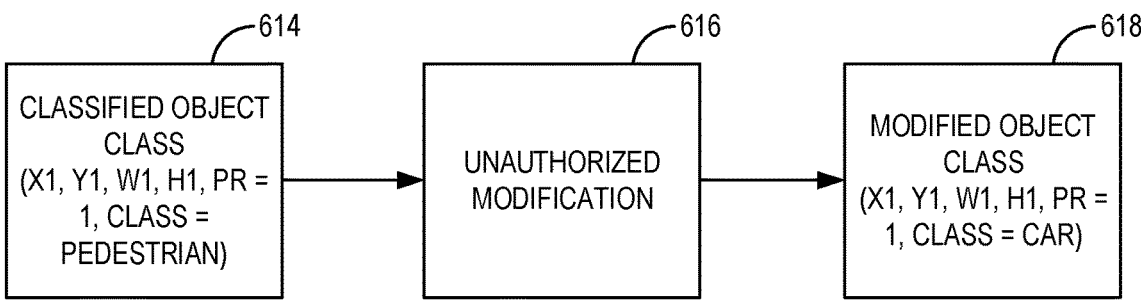
Figure 7:
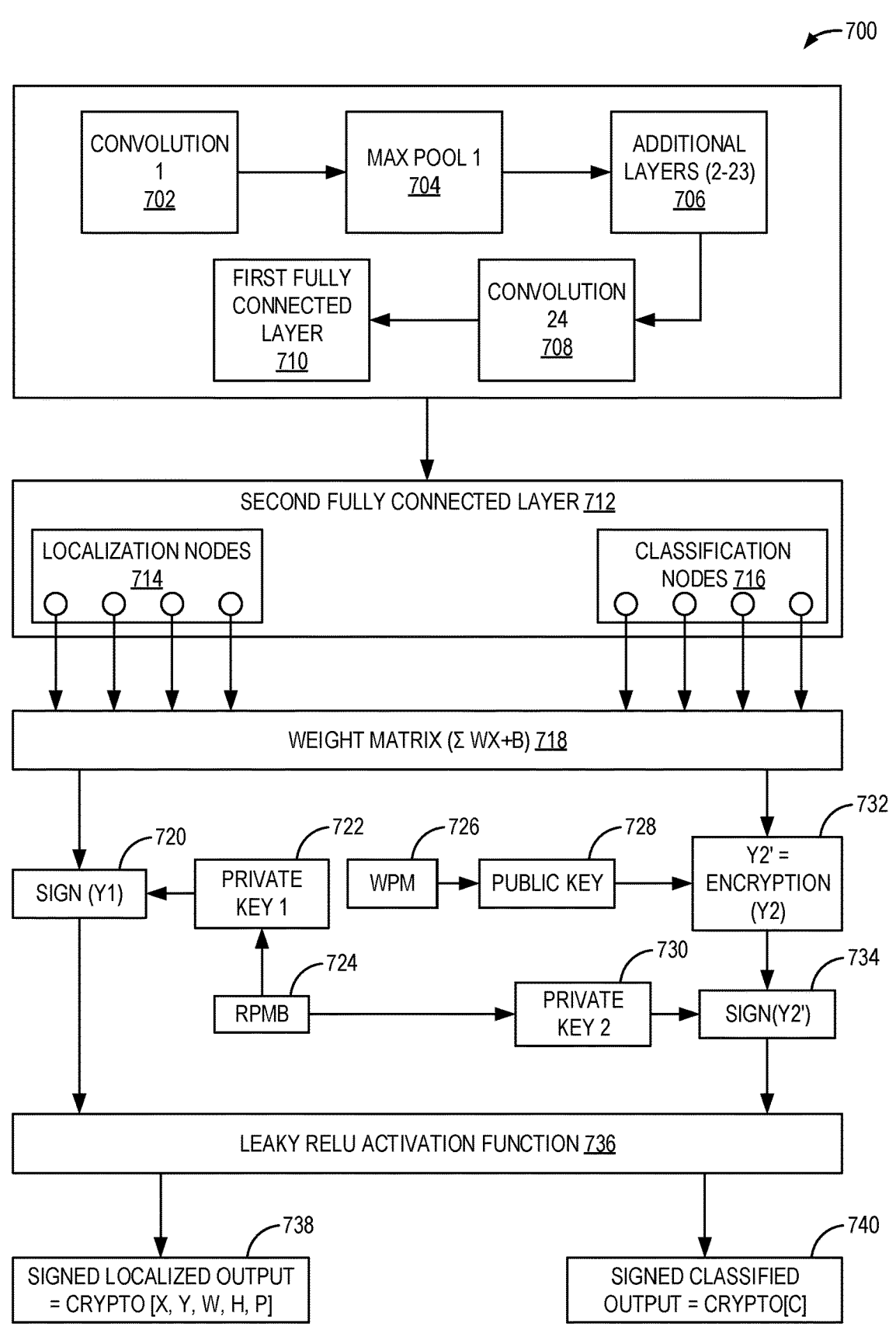
FIG. 7 shows an example neural network, including a YOLO algorithm, for object detection in an object detection system in accordance with one or more embodiments of the present disclosure.

As described above, a vehicle may include object detection and perception for monitoring an environment surrounding the vehicle. For example, a vehicle, such as the vehicle shown in FIG. 1, may be at least partially autonomous, and may adjust one or more vehicle system based on object detection. In other examples, the vehicle may include one or more driver assistance systems for intermittently adjusting vehicle operation. The vehicle shown in FIG. 1 may include an in-vehicle computing system and a vehicle control system, as shown in FIG. 2. The vehicle may include sensors, which may provide data to the object detection system, as shown in the sensor data flow of FIG. 3. The object detection system may localize and classify objects in a scene, such as the scene shown in FIG. 4. In particular, the object detection system may include a neural network for localizing and classifying objects as shown in FIG. 5. However, in some examples, a location and a classification of a detected object may be modified by an unauthorized entity as shown in FIG. 6. A neural network with encryption to reduce an incidence of unauthorized modification is shown in FIG. 7. For example, localization and classification for object detection may be encrypted according to the method of FIG. 8. A method for verifying the encryption is shown in FIG. 9.

Figure 1:
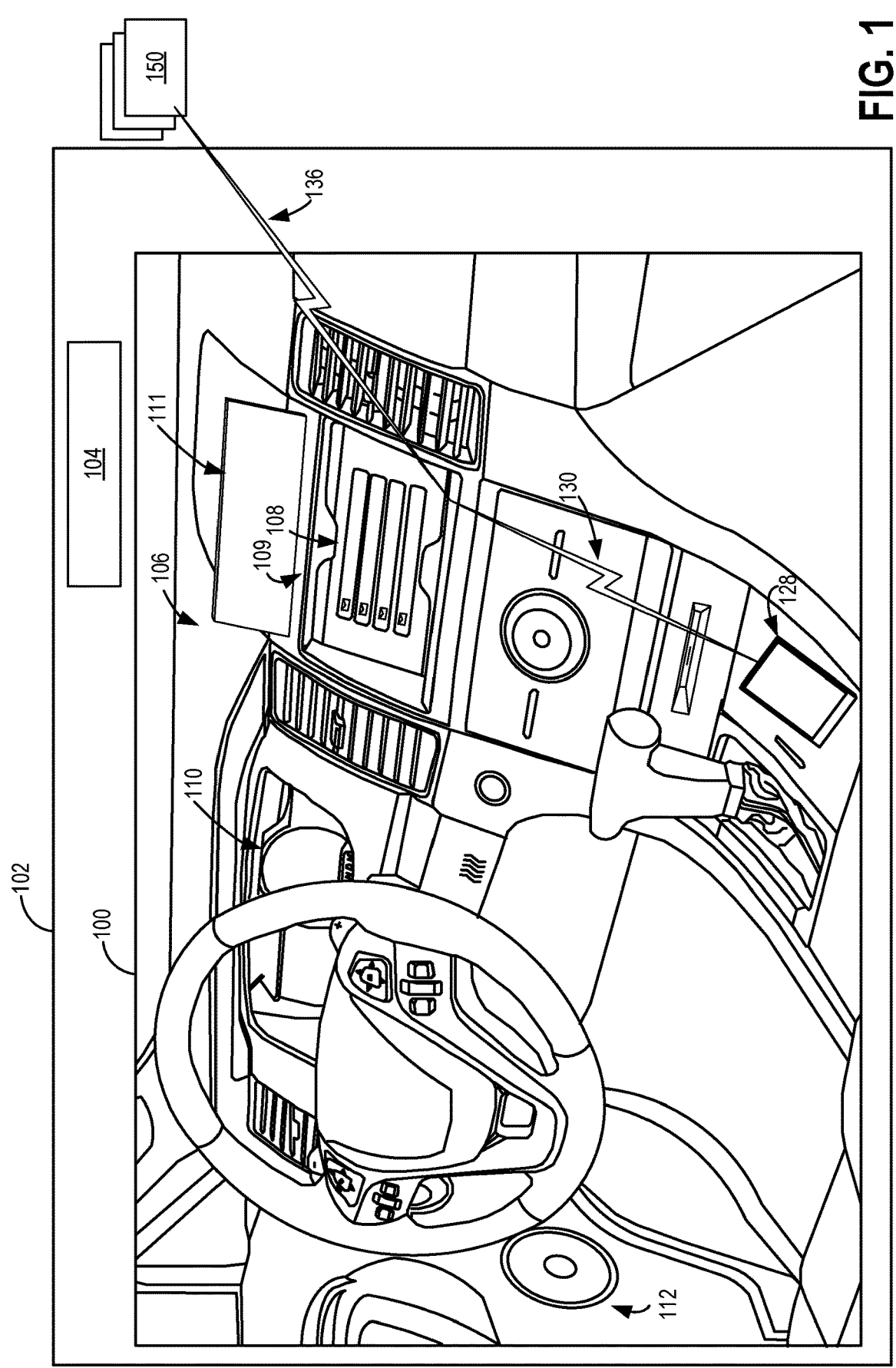
FIG. 1 shows an example partial view of a vehicle cabin in accordance with one or more embodiments of the present disclosure.
Figure 2:
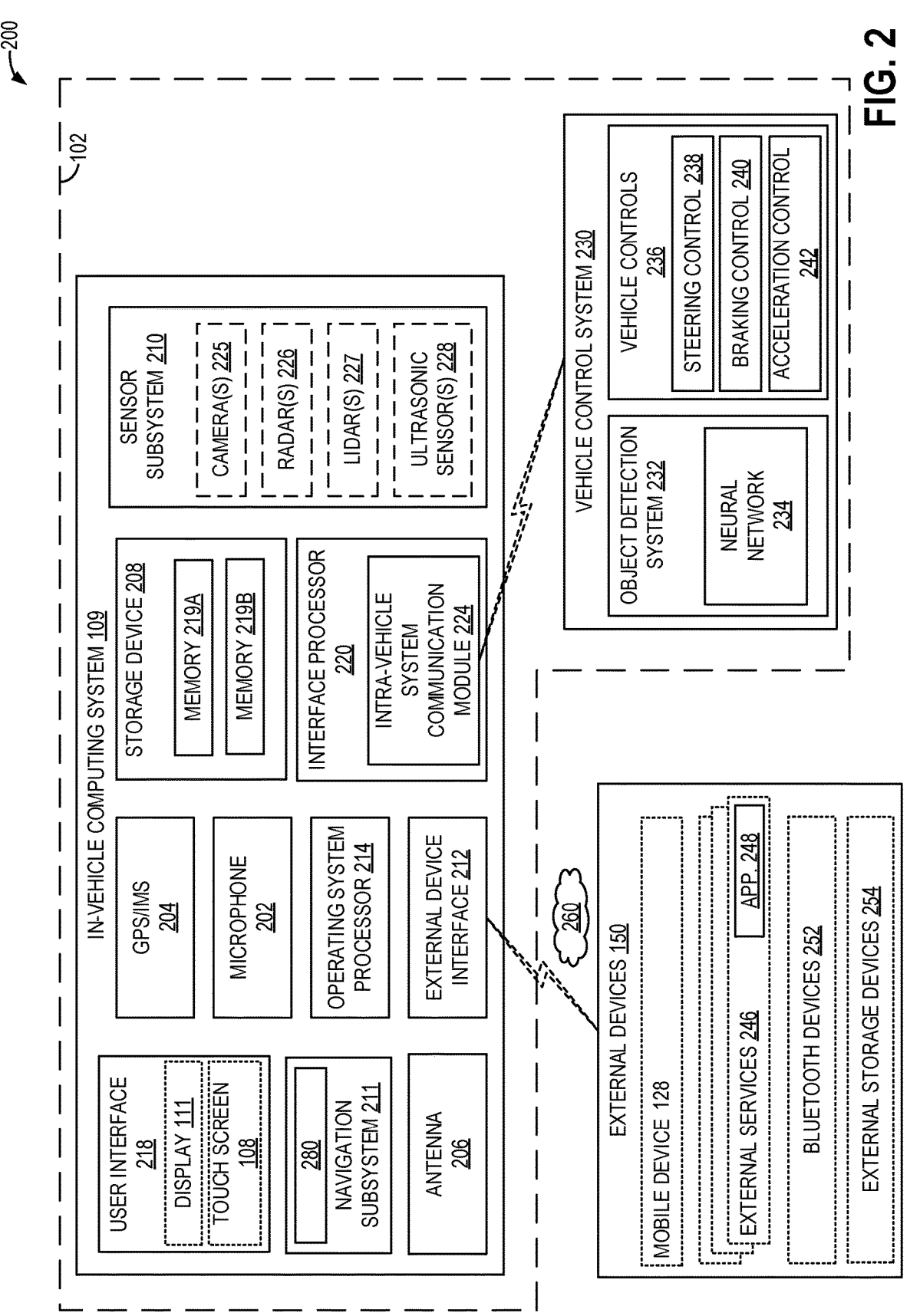
FIG. 2 shows a block diagram of an example in-vehicle computing system of a vehicle with an object detection system, in accordance with one or more embodiments of the present disclosure.

FIG. 1 shows an interior of a cabin 100 of a vehicle 102, in which a driver and/or one or more passengers may be seated. Vehicle 102 may be a road automobile, among other types of vehicles. In particular, vehicle 102 of FIG. 1 may be a motor vehicle including drive wheels (not shown) and an engine 104. In some examples, engine 104 may be an internal combustion engine. In other examples, engine 104 may be an electric engine, or may include hybrid components. For example, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

Further, in some examples, vehicle 102 may be an autonomous vehicle. In some examples, vehicle 102 is a fully autonomous vehicle (e.g., fully self-driving vehicle) configured to drive without a user input. For example, vehicle 102 may independently control vehicle systems in order to direct the vehicle to a desired location, and may sense environmental features in order to direct the vehicle (e.g., such as via object detection). In some examples, vehicle 102 is a partially autonomous vehicle. In some examples, vehicle 102 may have an autonomous mode, in which the vehicle operates without user input, and a non-autonomous mode, in which the user directs the vehicle. Further, in some examples, while an autonomous vehicle control system may primarily control the vehicle in an autonomous mode, a user may input commands to adjust vehicle operation, such as a command to change a vehicle speed, a command to brake, a command to turn, and the like. In still other examples, the vehicle may include at least one driver assistance system for partially controlling the vehicle, such as a cruise control system, a collision avoidance system, a lane change system, and the like.

Vehicle 102 may include a plurality of vehicle systems, including a braking system for providing braking, an engine system for providing motive power to wheels of the vehicle, a steering system for adjusting a direction of the vehicle, a transmission system for controlling a gear selection for the engine, an exhaust system for processing exhaust gases, and the like. Further, the vehicle 102 includes an in-vehicle computing system 109. The in-vehicle computing system 109 may include an autonomous vehicle control system for at least partially controlling vehicle systems during autonomous driving. As an example, while operating in an autonomous mode, the autonomous vehicle control system may monitor vehicle surroundings via a plurality of sensors (e.g., such as cameras, radars, ultrasonic sensors, a GPS signal, and the like).

As shown, an instrument panel 106 may include various displays and controls accessible to a human user (also referred to as the passenger) of vehicle 102. For example, instrument panel 106 may include a user input device such as a touch screen 108 of an in-vehicle computing system 109, an audio system control panel, and an instrument cluster 110. Touch screen 108 may receive user input to the in-vehicle computing system 109 for controlling audio output, visual display output, user preferences, control parameter selection, etc. In some examples, instrument panel 106 may include an input device for a user to transition the vehicle between an autonomous mode and a non-autonomous mode. For example, the vehicle includes an autonomous mode in which the autonomous vehicle control system operates the vehicle at least partially independently, and a non-autonomous mode, in which a vehicle user operates the vehicle. The vehicle user may transition between the two modes via the user input of instrument panel 106. Further, in some examples, instrument panel 106 may include one or more controls for the autonomous vehicle control system, such as for selecting a destination, setting desired vehicle speeds, setting navigation preferences (e.g., a preference for highway roads over city streets), and the like. Further still, in some examples, instrument panel 106 may include one or more controls for driver assistance programs, such as a cruise control system, a collision avoidance system, and the like. Further, additional user interfaces, not shown, may be present in other portions of the vehicle, such as proximate to at least one passenger seat. For example, the vehicle may include a row of back seats with at least one touch screen controlling the in-vehicle computing system 109.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, sensor subsystem, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding navigational map data, image feature mapping data, etc. and may transmit such information from the external devices 150 to in-vehicle computing system 109 and/or touch screen 108.

In-vehicle computing system 109 may analyze the input received from external devices 150, mobile device 128, and/or other input sources and provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, the external devices 150 may include in-vehicle computing devices of another vehicle.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

FIG. 2 shows a block diagram of an in-vehicle computing system 109 configured and/or integrated inside vehicle 102. In-vehicle computing system 109 may perform one or more of the methods described herein in some embodiments. The in-vehicle computing system may include, or be coupled to, various vehicle systems, sub-systems, hardware components, as well as software applications and systems that are integrated in, or integratable into, vehicle 102 in order to enhance an in-vehicle experience for a driver and/or a passenger. Further, the in-vehicle computing system may be coupled to systems for providing autonomous vehicle control.

In-vehicle computing system 109 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an intra-vehicle system communication module 224.

Intra-vehicle system communication module 224 may output data to vehicle control system 230, while also receiving data input from other vehicle components and systems, e.g. by way of vehicle control system 230. When outputting data, intra-vehicle system communication module 224 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, Inertial Measurement System [IMS] etc.), digital signals propagated through vehicle data networks (such as an engine Controller Area Network [CAN] bus through which engine related information may be communicated, a climate control CAN bus through which climate control related information may be communicated, and a multimedia data network through which multimedia data is communicated between multimedia components in the vehicle). For example, vehicle data outputs may be output to vehicle control system 230, and vehicle control system 230 may adjust vehicle controls 236 based on the vehicle data outputs. For example, the in-vehicle computing system 109 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A storage device 208 may be included in in-vehicle computing system 109 to store data such as instructions executable by processors 214 and 220 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., user interface 218), data stored in volatile memory 219A or non-volatile storage device (e.g., memory) 219B, devices in communication with the in-vehicle computing system (e.g., a mobile device connected via a Bluetooth link), etc. In-vehicle computing system 109 may further include a volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214 and/or interface processor 220), controls the in-vehicle computing system 109 to perform one or more of the actions described in the disclosure.

One or more additional sensors may be included in a sensor subsystem 210 of the in-vehicle computing system 109. For example, the sensor subsystem 210 may include a plurality of sensors for monitoring an environment around the vehicle. For example, the sensor subsystem 210 may include a plurality of cameras 225, one or more radars 226, one or more Lidar(s) 227, and one or more ultrasonic sensors 228. For example, the sensors of sensor subsystem 210 may be used for object detection, such as by an object detection system 232. Sensor subsystem 210 of in-vehicle computing system 109 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A microphone 202 may be included in the in-vehicle computing system 200 to measure ambient noise in the vehicle, to measure ambient noise outside the vehicle, etc. One or more additional sensors may be included in and/or communicatively coupled to a sensor subsystem 210 of the in-vehicle computing system 200. For example, the sensor subsystem 210 may include and/or be communicatively coupled to a camera, such as a rear view camera for assisting a user in parking the vehicle, a cabin camera for identifying a user, and/or a front view camera to assess quality of the route segment ahead. The above-described cameras may also be used to provide images to a computer vision-based traffic sign detection module. Sensor subsystem 210 of in-vehicle computing system 200 may communicate with and receive inputs from various vehicle sensors and may further receive user inputs. While certain vehicle system sensors may communicate with sensor subsystem 210 alone, other sensors may communicate with both sensor subsystem 210 and vehicle control system 230, or may communicate with the sensor subsystem 210 indirectly via vehicle control system 230. Sensor subsystem 210 may serve as an interface (e.g., a hardware interface) and/or processing unit for receiving and/or processing received signals from one or more of the sensors described in the disclosure.

A navigation subsystem 211 of in-vehicle computing system 109 may generate and/or receive navigation information such as location information (e.g., via a GPS/IMS sensor 204 and/or other sensors from sensor subsystem 210), route guidance, traffic information, point-of-interest (POI) identification, and/or provide other navigational services for the user. Navigation sub-system 211 may include inputs/outputs 280, including analog to digital converters, digital inputs, digital outputs, network outputs, radio frequency transmitting devices, etc. In some examples, navigation sub-system 211 may interface with vehicle control system 230.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a Bluetooth, NFC, WIFI direct, or other wireless connection) or an alternate Bluetooth-enabled device 252. Mobile device 128 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 150 may communicate with in-vehicle computing system 109 either wirelessly or via connectors without departing from the scope of this disclosure. For example, external devices 150 may communicate with in-vehicle computing system 109 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the user. For example, the external device interface 212 may enable voice calls to be established and/or text messages (e.g., SMS, MMS, etc.) to be sent (e.g., via a cellular communications network) to a mobile device 128 associated with a contact of the user. Further, in some examples, a vehicle user may adjust autonomous vehicle operation via an application of the mobile device 128 associated with the user. The external device interface 212 may additionally or alternatively provide a wireless communication interface to enable the in-vehicle computing system to synchronize data with one or more devices in the vehicle (e.g., the user's mobile device) via WIFI direct.

One or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the user, vehicle, and environment and perform an action based on the context (e.g., requesting/sending data to other devices).

In-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via FR such as via antenna(s) 206 or via infrared or other means through appropriate receiving devices. For example, antenna 206 may receive voice calls (e.g., such as telephone calls). Additionally, antenna 206 may provide AM/FM radio signals to external devices 150 (such as to mobile device 128) via external device interface 212.

Vehicle control system 230 may include vehicle controls 236 for controlling aspects of various vehicle systems. For example, vehicle controls 236 includes steering control system 238, braking control system 240, and acceleration control system 242. Vehicle controls 236 may include additional control systems. In some example, vehicle controls 236 may be operated autonomously, such as during autonomous vehicle operation. In other examples, vehicle controls 236 may be controlled by a user. Further, in some examples, a user may primarily control vehicle controls 236, while a variety of driver assistance programs may intermittently adjust vehicle controls 236 in order to increase vehicle performance. For example, the variety of driver assistance system may include a cruise control system, a lane departure warning system, a collision avoidance system, an adaptive braking system, and the like.

Braking control system 240 may be configured to control an amount of braking force applied to the vehicle. For example, during a non-autonomous mode of operation, braking system 240 may be controlled by a brake pedal. For example, the user may depress the brake pedal in order to increase an amount of braking applied to the vehicle. During an autonomous mode of operation, braking system 240 may be controlled autonomously. For example, the vehicle control system 230 may determine that additional braking is requested, and may apply additional braking. In some examples, the autonomous vehicle control system may depress the brake pedal in order to apply braking (e.g., to decrease vehicle speed and/or bring the vehicle to a stop). In some examples, a driver assistance system may adjust braking control system 240.

Acceleration control system 242 may be configured to control an amount of acceleration applied to the vehicle. For example, during a non-autonomous mode of operation, acceleration control system 242 may be controlled by an acceleration pedal. For example, the user may depress the acceleration pedal in order to increase an amount of torque applied to wheels of the vehicle, causing the vehicle to accelerate in speed. During an autonomous mode of operation, acceleration control system 242 may be controlled by vehicle control system 230. In some examples, a driver assistance system may adjust acceleration control system 242. For example, vehicle control system 230 may determine that additional vehicle speed is requested, and may increase vehicle speed via acceleration. In some examples, vehicle control system 230 may depress the acceleration pedal in order to accelerate the vehicle. As an example of a driver assistance system adjusting acceleration control system 242, the driver assistance system may be a cruise control system, and may include adjusting vehicle acceleration in order to maintain a desired speed during vehicle operation.

Steering control system 238 may be configured to control a direction of the vehicle. For example, during a non-autonomous mode of operation, steering control system 238 may be controlled by a steering wheel. For example, the user may turn the steering wheel in order to adjust a vehicle direction. During an autonomous mode of operation, steering control system 238 may be controlled by vehicle control system 230. In some examples, a driver assistance system may adjust steering control system 238. For example, the vehicle control system 230 may determine that a change in vehicle direction is requested, and may change the vehicle direction via controlling the steering control system 238. For example, vehicle control system 230 may adjust axles of the vehicle in order to change the vehicle direction.

Vehicle control system 230 may also include controls for adjusting the settings of various vehicle controls (or vehicle system control elements) related to the engine and/or auxiliary elements within a cabin of the vehicle, such as steering wheel controls (e.g., steering wheel-mounted audio system controls, climate controls, cruise controls, windshield wiper controls, headlight controls, turn signal controls, etc.), instrument panel controls, microphone(s), a gear shift, door/window controls positioned in a driver or passenger door, seat controls, cabin light controls, etc. Vehicle controls may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control a vehicle audio system (not shown). For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of a climate control system. For example, the control signals may increase delivery of cooled air to a specific section of the cabin. For example, while operating in an autonomous mode, the autonomous vehicle control system may control some or all of the above vehicle controls. Further, vehicle control system 230 may include a plurality of driver assistance systems, such as a cruise control system and a collision avoidance system.

Control elements positioned on an outside of a vehicle (e.g., controls for a security system) may also be connected to computing system 109, such as via communication module 224. The control elements of the vehicle control system may be physically and permanently positioned on and/or in the vehicle for receiving user input. In addition to receiving control instructions from in-vehicle computing system 109, vehicle control system 230 may also receive input from one or more external devices 150 operated by the user, such as from mobile device 128. This allows aspects of vehicle controls 236 to be controlled based on user input received from the external devices 150.

Vehicle control system 230 includes object detection system 232 for detecting objects. For example, object detection system 232 may receive sensor data from sensor subsystem 210 via intra-vehicle system communication module 224, and may identify objects in the environment surrounding the vehicle, such as traffic lights, other vehicles, pedestrians, and the like. The outputs of object detection system 232 may be used for a variety of systems, such as for adjusting vehicle controls 236, for notifying a user of an object, for autonomous vehicle control, for driver assistance systems, and the like. In particular, object detection system 232 includes a neural network 234. Neural network 234 may be a convolutional neural network (CNN) trained on sensor data to detect and identify objects. As one example, object detection system 232 may employ a You Only Look Once (YOLO) as one type of Neural Network Object Detector for detecting and identifying objects via the neural network 234. In other examples, object detection system 232 may use other object detectors, such as Spatial Pyramid Pooling (SPP), Faster R-CNN (FRCN), Region Proposal Network (RPN), Single Shot Detector (SSD), Deconvolutional Single Shot Detector (DS SD), RetinaNet, Deformable convolution networks, and the like. A Fully Convolutional Network (FCN), Batch Normalization (BN), deconvolutional layers, and the like are exemplary internal sub-components inside a neural network, such as, for example, neural network 234. The object detection system 232 will be described with respect to the YOLO detector herein. However, other object detection frameworks (more appropriately, object detectors), such as the above-mentioned object detectors, may be used without deviating from the scope of the current disclosure. An object detection system, such as object detection system 232, is elaborated in more detail below with respect to FIGS. 3-9.

Figure 3:
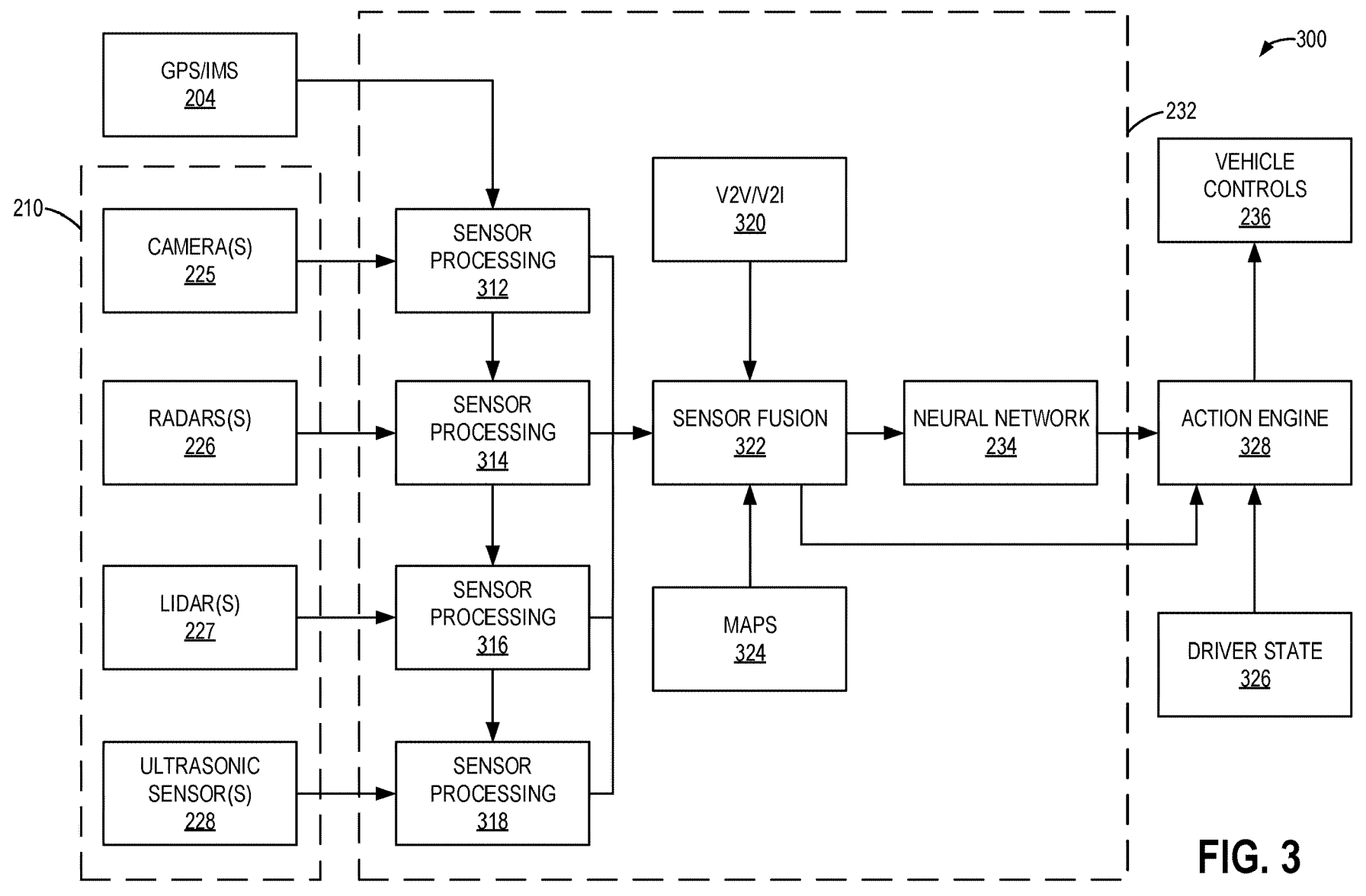

Next, FIG. 3 shows a block diagram of an example data flow 300 for object detection system 232 of in-vehicle computing system 109 of FIGS. 1 and 2. For example, the example data flow 300 of FIG. 3 may be used for object detection system 232 in in-vehicle computing system 109 of FIG. 2. Like components may be numbered the same and not reintroduced. As shown in FIG. 3, data from a plurality of sensors may be transmitted to object detection system 232. For example, data from GPS/IMS 204 and sensors 210 may be transmitted to object detection system 232. Object detection system 232 includes a plurality of sensor processing blocks for processing the sensor data. As shown, data from GPS/IMS 204 and camera(s) 225 is transmitted to a sensor processing block 312, data from radar(s) 226 is transmitted to a sensor processing block 314, data from Lidar(s) 227 is transmitted to a sensor processing block 316, and data from ultrasonic sensor(s) 228 is transmitted to a sensor processing block 318. Data from each of sensor processing block 312, sensor processing block 314, sensor processing block 316, and sensor processing block 318 is transmitted to sensor fusion block 322. For example, sensor fusion block 332 may combine data from each of the sensor processing block. Sensor fusion 322 may further incorporate Vehicle-to-Vehicle (V2V) and/or Vehicle-to-Infrastructure (V2I) 320 and map data 324. Data from sensor fusion 322 may be used for object detection, or object detection may be used for date comprising data fusion 322, depending upon the type of sensor fusion technique choses. Data from sensor fusion 322 may be shared with neural network 234 for object detection. For example, images from camera(s) 225, along with contextualizing data from GPS/IMS 204 and other sensors may be provided as an input to neural network 234. For example, a camera image may be combined with contextual data from GPS, radar, Lidar, ultrasonic, and other sensors, which may increase an accuracy of the neural network during object detection. Neural network 234 is described in more detail with respect to FIG. 7. The output of neural network 234 may be locations and classifications of objects in camera images from camera(s) 225. For example, neural network 234 may output bounding boxes for objects in camera images from camera(s) 225, the bounding boxes describing a location and size of the detected objects. Output of sensor fusion 322, output of the neural network 234, and a driver state 326 may be transmitted to an action engine 328. For example, action engine 328 may determine how to adjust vehicle controls based on the results of sensor fusion block 322 and the driver state 326 (e.g., a steering wheel position, an acceleration pedal position, etc.). Finally, the results of action engine 328 are used to adjust vehicle controls 236. For example, the results of the object detection system 232 may be used by one or both of an autonomous vehicle control system and a driver assistance system.

Figure 4:
FIG. 4 shows an example scene for object detection by an object detection system, in accordance with one or more embodiments of the present disclosure.

Next, FIG. 4 shows an example image 400 with object detection. In particular, the example image 400 may be an image from a camera of a vehicle, and the image may be used for object detection. In some examples, additional sensor data, such as radar, Lidar, ultrasonic sensors, maps, and the like may be used to augment object detection. As shown, the image shows a plurality of objects, with each detected object identified with a bounding box. For example, the plurality of bounding boxes shown in FIG. 4 may be an output of a neural network of an object detection system, such as the object detection system 232 shown in FIG. 2. For example, image 400 includes a first vehicle 418, a second vehicle 420, a traffic light 422, a pedestrian 424, a truck 426, a first road 414, and a second road 416. Further, detected objects may be identified by a bounding box. Each bounding box may localize the object, and may also include classification information for the detected object. The classification information may include the type of object identified. As shown, first vehicle 418 is identified via bounding box 404, which may include a location of first vehicle 418 and a classification for first vehicle 418. Further, second vehicle 420 may be identified via bounding box 406. Traffic light 422 may be identified via bounding box 408, pedestrian 424 may be identified via bounding box 410, and truck 426 may be identified via bounding box 412. In some examples, the bounding boxes may be used by a vehicle system to adjust vehicle operation, such as to adjust vehicle direction and speed based on detected objects (e.g., objects identified by bounding boxes).

In particular, each bounding box may be described by a set of coordinates [X, Y, W, H, P, C], which may describe the location of the bounding box, a size of the bounding box, a probability of the detected object, and a class of the detected object. For example, coordinates [X, Y] may correspond to a location of the bounding box in the image with respect to Cartesian axes 499. For example, both of bounding box 406 and bounding box 404 may have the same Y coordinates, and distinct X coordinates. Further, coordinates [W, H] may correspond to a width and height of the bounding box. For example, the bounding box is sized based on a size of the detected object, so the width and height of the bounding box may correspond to a size of the detected object. Further, coordinate P refers to a probability that the detected object is present. Further still, coordinate C refers to a class assigned to the detected object. As an example, the class C associated with bounding box 410 may be a pedestrian class, while the class C associated with bounding box 404 may be a vehicle class.

Next, FIG. 5 shows an example architecture of a neural network 500, such as may be used for object detection. For example, the neural network 500 may be neural network 234 of FIGS. 2 and 3. In particular, FIG. 5 shows a neural network with a YOLO algorithm for object detection (e.g., a YOLO neural network). For example, the YOLO neural network comprises a plurality of convolutional layers followed by two fully connected layers. For example, an image 502 may be input into a feature extraction block 504. For example, feature extraction block 504 may use deep learning to extract features (e.g., such as objects) from image 502. In particular, feature extraction block 504 includes the plurality of convolutional layers of the neural network. The output of feature extraction block 504 may be localization head 506 and classification head 508. Localization head 506 may describe a location of an extracted feature (e.g., detected object), and classification head 508 may describe an object class. In particular, localization head 506 and classification head 508 may be part of a fully connected layer of the neural network. For example, localization head 506 comprises a first plurality of nodes of the fully connected layer of the neural network, and classification head 508 comprises a second plurality of nodes of the fully connected layer of the neural network. The output of localization head 506 may be localized output 510, which may include coordinates [X, Y, W, H, P] of the detected object. For example, coordinates [X, Y] may describe a location of a bounding box identifying the object, and coordinates [W, H] may describe a size of the bounding box. Further, coordinate [P] may describe a probability of the object detected. The output of classification head 508 is classified output 512, including class C of the detected object. For example, the class C may describe the type of detected object, so that each possible value of class C corresponds to a type of object, such as a car, a pedestrian, a truck, a traffic light, a traffic sign, and the like. Further, the classified output 512 and the localized output 510 are the output of a fully connected layer of the neural network. Taken together, the localized output 510 and the classified output 512 may describe a location and size of a bounding box of an object, a class of object detected, and a probability of object presence. As such, the output of the YOLO neural network may detect objects, and output coordinates of a bounding box for the object and a classification of the object.

However, in some examples, results of a neural network architecture, such as neural network 500, may be modified by an unauthorized entity. In particular, an unauthorized modification may occur at stage 514, so that the output of one or both of localization head 506 and classification head 508 is modified. Stage 514 occurs at the fully connected layers of the neural network where classification and localization occurs. As an example, the unauthorized modification at stage 514 may occur at the fully connected layers of the neural network, that is, in the layers where the neural network classifies and localizes objects in the image. For example, one or both of the first plurality of nodes (e.g., corresponding to the localization head 506) and the second plurality of nodes (e.g., corresponding to classification head 508) may be targeted for unauthorized modification. The unauthorized modification may be an intentional modification by an external entity, and may adjust at least one of the outputs of the neural network, such as the bounding box size, location, probability, or the object class. Further, by modifying the output of the YOLO neural network 500, vehicle operation may be adjusted. Unauthorized modifications may decrease accuracy of the object detection system, may decrease functional safety of the vehicle, and may decrease customer satisfaction with vehicle systems, such as autonomous vehicle control systems and driver assistance systems.

Next, FIG. 6 shows a view 600 of possible unauthorized modifications which may occur in a neural network of an object detection system (e.g., object detection system 232 of FIG. 2). For example, the neural network may be a YOLO neural network with the architecture shown in FIG. 5. As a first example, a localized object bounding box 602 may be described by a set of coordinates [X1, Y1, W1, H1] describing the size and location of the bounding box 602. The localized object bounding box 602 may be an output of localization nodes of the YOLO neural network. An unauthorized modification 604 may modify the localized object bounding box 602 to a modified object bounding box 606 described by an adjusted set of coordinates [X2, Y2, W2, H2]. For example, the adjusted set of coordinates [X2, Y2, W2, H2] may be different from coordinates [X1, Y1, W1, H1]. As a second example, a localized object presence probability 608 may be described by a set of coordinates [X1, Y1, W1, H1, P=1]. The localized object presence probability 608 may describe a probability [P=1] that a detected object is present, and may be an output of the localization nodes of the YOLO neural network. An unauthorized modification 610 may adjust localized object presence probability 608 to a modified object present probability 612 with an adjusted set of coordinates [X1, Y1, W1, H1, P=0]. In particular, the adjusted set of coordinates includes an adjusted probability for the object (e.g., the probability is zero rather than one). As a third example, a classified object class 614 includes coordinates [X1, Y1, W1, H1, P=1, Class=Pedestrian]. For example, the objet class [Class=Pedestrian] classifies the type of object detected, which may be used to adjust vehicle operation. An unauthorized modification 616 may adjust classified object class 614 to a modified object class 618, so that coordinates [X1, Y1, W1, H1, P=1, Class=Pedestrian] are replaced with [X1, Y1, W1, H1, P=1, Class=Car]. In particular, the class of the object is modified from "pedestrian" to "car."

Such unauthorized modifications may trigger unrequested behavior of the vehicle, such as turning to avoid a nonexistent object, not avoiding an upcoming object, not correctly responding to a traffic signal, and the like, decreasing user comfort during vehicle operation. For example, the vehicle may be operated differently when a pedestrian is detected in a roadway, relative to when a vehicle is detected in the roadway. For example, an unauthorized modification may lead to an increased incidence of noise, vibration, and handling issues (NVH). As another example, an unauthorized modification may change the vehicle route, increasing an amount of drive time. Overall, unauthorized modifications to the output of the YOLO algorithm may decrease the safety of vehicles and/or decrease customer satisfaction.

The inventor herein has recognized that including a cryptographic mechanism at the fully connected layers of the neural network may decrease an incidence of unauthorized modification, and may allow the controller to detect unauthorized modifications. For example, including the cryptographic mechanism may increase accuracy of vehicle controls and increase customer satisfaction and vehicle safety. For example, the cryptographic mechanism may be added inside the nodes (Neurons) of the fully connected layers, so that the cryptographic output is verified. Such cryptographic mechanism may involve using a plurality of private and public keys, and verifying the signatures before accepting the results of the object detection system.

Next, FIG. 7 shows a schematic diagram of a YOLO neural network 700 for object detection. For example, YOLO neural network 700 may be similar the YOLO neural network shown in FIG. 5. However, YOLO neural network 700 includes a cryptographic mechanism for preventing an unauthorized modification to output of the YOLO neural network 700. Stated differently, YOLO neural network 700 is a YOLO neural network with cryptographic protection. As shown in FIG. 7, YOLO neural network 700 includes a first convolutional layer 702, a first maximum pool 704, additional convolutional and pooling layers 706 (e.g., additional convolutional layers 2-23, according to the architecture of YOLO neural network). The YOLO neural network 700 comprises a plurality of layers, into which a camera image may be input. The convolutional layers of the neural network may process the input data, and may output a location of a bounding box and a classification of the object. For example, an input is provided to the first convolutional layer 702, and the output of the first convolutional layer 702 is provided to the first maximum pooling layer 704. The output of the first maximum pooling layer 704 is passed through additional convolutional and pooling layers 706. Next, the outputs of the additional convolutional layers 706 are passed to convolutional layer 24 708, which outputs to the first fully connected layer 710.

As to the second fully connected layer 712 of the YOLO neural network, according to some embodiments, the following three noted concepts apply. As a first noted concept, in some embodiments the system does modifications at the second fully connected layer 712 of the YOLO. The second fully connected layer may comprise nothing but the output layer of the YOLO neural network or the last layer of the YOLO neural network or the last fully connected layer of the YOLO neural network. A neural network node may perform the operations: a) first calculating $\Sigma WX+B$ (for a weight matrix 718), where X is the output from the previous layer nodes, W is the weight connecting the previous layer nodes to the current layer nodes, and B is the bias of the current node; and b) then apply an activation function "f" to $\Sigma WX+B$ to insert non-linearity, or output of node=$f(\Sigma WX+B)$ (such as, for example, the activation function 736). Any layer of the neural network may comprise an array of neurons of the above kind. Similarly, the fully connected layer two of the YOLO neural network may be an array of neurons of the above kind, which performs $f(\Sigma WX+B)$, where X=Output from the fully connected layer one, W=Weight connecting the neurons of the fully connected layer one to fully connected layer two, f=activation function, and B=bias of the fully connected layer two.

As a second noted concept, in some embodiments, the system applies the cryptographic components in $f(\Sigma WX+B)$ in all the nodes of the fully connected layer two of YOLO neural network. Among the array of all the nodes of the fully connected layer two, some nodes comprise localization nodes and remaining comprise classification nodes. The modifications inside each neuron of the fully connected layer two preferably include: a) find $\Sigma WX+B$, where X=Output from the fully connected layer one, W=Weight connecting the neurons of the fully connected layer one to fully connected layer two, and B=Bias of fully connected layer two, wherein Y1=($\Sigma WX+B$) (Localization nodes) and Y2=($\Sigma WX+B$) (Classification nodes); b) addition of cryptographic components into nodes of fully connected layer two, which comprises signature to each of the localization nodes and encryption 732 with signature to each of the classification nodes 716 of fully connected layer two, thus giving Sign(Y1) 720 for localization nodes 714 and Sign (Y2') 734 for classification nodes 716, where Y2'=Encryption (Y2) 732; and c) application of an activation function to all the generated Sign(Y1) 720 and Sign (Y2') 734.

As a third noted concept, in some embodiments, the combination of above steps a), b), and c) from the second noted concept comprises a fully connected layer two, which may comprise nothing but an array of nodes where some are localization nodes and remaining are classification nodes. Thus, the fully connected layer two may equal (($\Sigma WX+B$)+ Cryptographic components+Activation function, at each node. Or, the fully connected layer two may equal the Activation_Function (Cryptography components ($\Sigma WX+B$)), at each node. Or, the fully connected layer two may equal f(Crypto ($\Sigma WX+B$)), at each node, where, f is an activation function, and Crypto is the added cryptographic components. The operations a), b), and c) from the second noted concept described above preferably occur inside each node. In some embodiments, the system comprises a modification of the node functionalities of the fully connected layer two in order to insert the cryptographic components, where the cryptographic components are the described signatures (on the localization nodes) and encryption with signature (on the classification nodes).

Still referring to FIG. 7, in some embodiments, the output of the first fully connected layer 710 is passed to the second fully connected layer 712. For example, the second fully connected layer 712 includes localization nodes 714 and classification nodes 716. For example, the localization nodes 714 and the classification nodes 716 output to a weight matrix 718, the weight matrix defined by the aforementioned described and defined formula: $\Sigma WX+B$. For example, the output of the second fully connected layer 712 is a bounding box and classified class for a detected object. Further, in order to increase system security and reduce an incidence of unwanted modification, the above described first, second, and third noted concepts are preferably applied. In some embodiments, the output of nodes comprises the final cryptographic localized and classified output, comprising 738 and 740, respectively, in FIG. 7. As shown, SIGN(Y1) 720 comprises a cryptographic signature generated based on a first private key 722. For example, the first private key 722 is stored in a replay protected memory block (RPMB) 724, and is used to generate a cryptographic signature. Further, SIGN(Y2') 734 comprises encryption at 732, so that Y2 is transformed to Y2'. Y2' is an encrypted version of Y2. For example, Y2 is encrypted based on a public key 728, the public key stored in a write-protected memory (WPM) 726 of the controller, yielding Y2'. Further, Y2' comprises a cryptographic signature, the cryptographic signature generated based on a second private key 730. The second private key 730 is stored in RPMB 724. As such, the result at block 734 is SIGN(Y2'), that is, an encrypted Y2 (e.g., Y2') signed with a cryptographic signature.

In some embodiments, the keys used comprise symmetric key pairs. For example, the key pair (Private Key 1, Public Key 1) may be associated with localization head signature; the key pair (Private Key 2, Public Key 2) may be associated with classification head signature; and the key pair (Private Key 3, Public Key 3) may be associated with encryption decryption of classification head. Preferably, all private and public key pairs are managed by vehicle manufacturers.

Next, as shown in FIG. 7, SIGN(Y1) from block 720 and SIGN (Y2') from block 734 are input to a leaky rectified linear unit (ReLU) activation function 736. For example, the output of the leaky ReLU activation function 736 is a cryptographically signed localized output 738 and a cryptographically signed classified output 740. For example, cryptographically signed localized output 738 includes encrypted coordinates [X, Y, W, H, P], and cryptographically signed classified output 740 includes encrypted class [C]. Stated differently, the classified output is both encrypted and cryptographically signed, which may decrease an incidence of unauthorized modification. As such, the YOLO architecture shown at FIG. 7 includes encryption of the classified head so that the output of the YOLO neural network comprises signed localized output 738 and signed and encrypted classified output 740, which may reduce an incidence of unauthorized modifications. Further, because the first private key 722 and the second private key 730 are stored in RPMB 724, each of the first private key 722 and the second private key 730 may not be modified by an external agent. For example, cryptographically signed localized output 738 is cryptographically signed coordinates [X, Y, W, H, P], and the cryptographically signed classified output 740 is a cryptographically signed and encrypted class C. The output of the YOLO neural network (e.g., cryptographically signed localized output 738 and cryptographically signed classified output 740) may be verified and decrypted via the verification method elaborated below with respect to FIG. 9.

Figure 8:
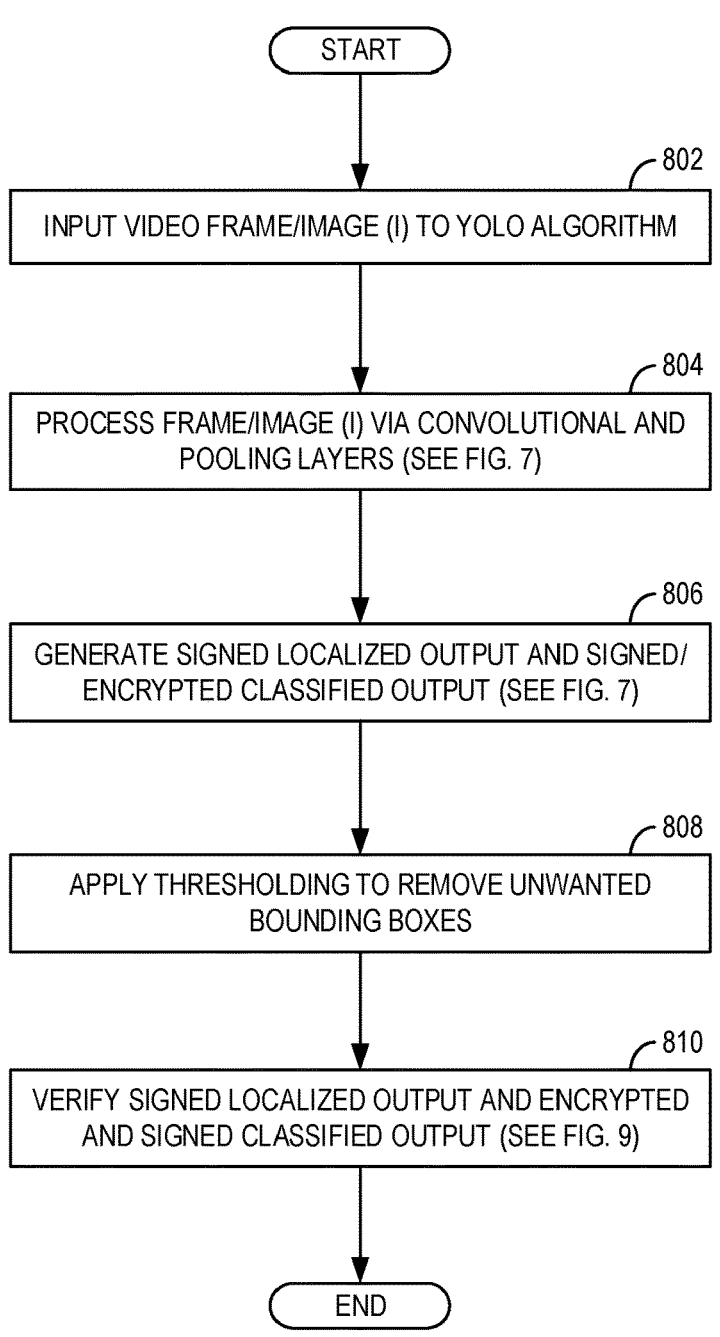
FIG. 8 shows a flowchart of a method for object detection in accordance with one or more embodiments of the present disclosure.
Figure 9:
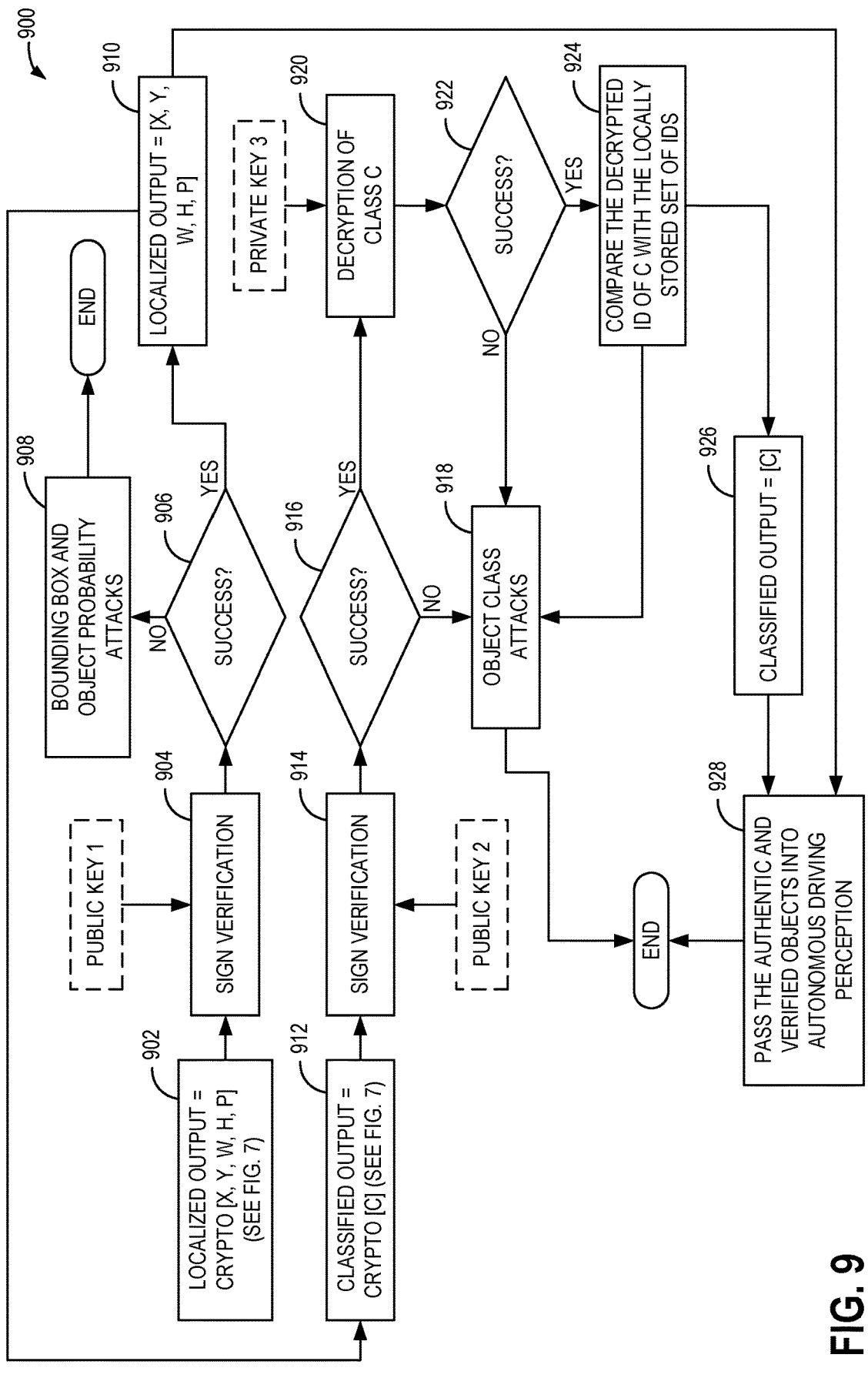
FIG. 9 shows a flowchart of a method for verifying output of a neural network for object detection, in accordance with one or more embodiments of the present disclosure.

Next, FIG. 8 shows a method for object detection with a YOLO neural network (e.g., a YOLO algorithm) with cryptographic protection in a vehicle. Method 800 will be described with respect to the YOLO neural network described with respect to FIG. 7. Further, the vehicle may be vehicle 102 described with respect to FIGS. 1 and 2. For example, the vehicle includes a controller and an object detection system, the object detection system including the YOLO neural network 700 of FIG. 7. Instructions for carrying out method 800 may be stored in non-transitory memory of the in-vehicle computing system (e.g., storage device 208 shown in FIG. 2). As such, method 800 may be executed by a processor (e.g., operating system processor 214 of FIG. 2 based on stored instructions and in conjunction with signals received from the sensors of the vehicle system, such as the sensors described hereinabove with reference to FIG. 2.

At step 802, method 800 includes inputting a video frame or image to the YOLO algorithm. For example, the input video frame/image may be an output of a camera of the vehicle, such as cameras 225 of FIG. 2. In some examples, a single video frame is input to the YOLO algorithm. In other examples, contextual information may also be input into the YOLO algorithm, such as map data, Lidar data, radar data, ultrasonic sensor data, and the like. For example, as shown in FIG. 3, additional sensor data may be combined via sensor fusion and provided as an input to the neural network. For example, by including contextual data, the YOLO algorithm may more accurately detect objects near the vehicle, which may increase customer satisfaction.

At step 804, method 800 includes processing the video frame or image via convolutional and pooling layers, as shown above in FIG. 7. For example, the video frame/image, along with contextual data, may be passed to the convolutional and pooling layers, as shown in FIG. 7. For example, each layer of the neural network includes a plurality of nodes, which may be used to extract object features from the camera frame/image. Further, the last fully connected layer may include a localization head (e.g., such as localization nodes 714 of FIG. 7) and a classification head (e.g., such as classification nodes 716 of FIG. 7) for predicting a location of a detected object and a class of a detected object.

At step 806, method 800 includes generating a cryptographically signed localized output and a cryptographically signed and encrypted classified output, as shown above in FIG. 7. For example, SIGN(Y1) 720 may comprise a cryptographic signature, the cryptographic signature based on a private key (e.g., the first private key 722 stored in RPMB 724 of FIG. 7). Further, Y2' 732 may be encrypted via a public key stored in WPM (e.g., such as public key 728 stored in WPM 726 of FIG. 7). Further, SIGN(Y2') 734 may be signed via a cryptographic signature, the cryptographic signature based on a second private key stored in RPMB (e.g., second private key 730 and RPMB 724 of FIG. y). Further, the signed output of the localization nodes and the signed/encrypted output of the classification nodes may be processed by an activation function (e.g., leaky RELU activation function 736), which may yield a localized output and a classified output at the output of the fully connected layer two. For example, the localized output is signed with a cryptographic signature, and includes coordinates [X, Y, W, H, P], and the classified output is signed with a cryptographic signature and encrypted, and includes a class C. For example, the cryptographic signatures for the localized output and the classified output may not be duplicated without access to the first private key and the second private key stored in RPMB.

At step 808, method 800 includes applying thresholding to remove unwanted bounding boxes. For example, thresholds may be applied to remove bounding boxes determined not to correspond to detected objects. In some embodiments, to make a final prediction, the method 800 keeps those boxes with high box confidence scores (greater than 0.25) as final predictions. The confidence score reflects how likely the box contains an object (objectness) and how accurate is the boundary box.

At step 810, method 800 includes verifying signed localized output and signed and encrypted classified output, as shown below in FIG. 9. For example, the method of FIG. 9 includes determining whether the output of the YOLO neural network is unmodified, and decrypting the classified output if the output of the YOLO neural network is determined to be valid. For example, if the output of the fully connected layer has been modified by an unauthorized entity, the cryptographic signature may not be verified. If the cryptographic signature is verified, the output of the neural network may be accepted and used to adjust vehicle operation. Method 800 may then end.

Next, FIG. 9 shows a method for verifying and decrypting outputs of a YOLO neural network for object detection of a vehicle. Method 900 will be described with respect to the YOLO neural network 700 of FIG. 7. Further, the vehicle may be vehicle 102 described with respect to FIGS. 1 and 2. For example, the vehicle includes a controller and an object detection system, the object detection system including the YOLO neural network of FIG. 7. Instructions for carrying out method 900 may be stored in non-transitory memory of the in-vehicle computing system (e.g., storage device 208 shown in FIG. 2). As such, method 900 may be executed by a processor (e.g., operating system processor 214 of FIG. 2 based on stored instructions and in conjunction with signals received from the sensors of the vehicle system, such as the sensors described hereinabove with reference to FIG. 2.

At step 902, method 900 includes taking a cryptographically signed localized output as an output of the object detection algorithm shown in FIG. 7. For example, the cryptographically signed localized output at 902 may be cryptographically signed localized output 738 of FIG. 7, and may be a cryptographically signed output with coordinates describing a location of a detected object and a probability of the detected object, [X, Y, W, H, P].

At step 904, method 900 includes verifying the cryptographically signed localized output of step 902 with a first public key (e.g., signature verification) (shown in FIG. 9 as "Public Key 1"). For example, the signature verification may be based on the public key stored in WPM, and may be used to determine whether the cryptographic signature is valid.

At step 906, method 900 includes determining whether the signature verification at step 904 is successful. For example, if the controller determines that the cryptographic signature is valid at step 904, the signature verification is successful and the controller determines that an unauthorized modification of the coordinates [X, Y, W, H, P] did not occur. Further, if the controller determines that the cryptographic signature is not valid at step 904, the signature verification is not successful.

If method 900 determines that the signature verification was not successful, method 900 continues to step 908 and includes determining that bounding box and object probability attacks may have occurred. For example, an unauthorized modification may have been made to one or more of the bounding box coordinates, bounding box size, and the object probability (e.g., to coordinates X, Y, W, H, P). Due to the unauthorized modification, the controller may determine not to use the output of the object detection system to adjust vehicle operation. In some examples, the controller may output an error message to a user. Further, in some examples, the controller may reset the cryptographic mechanism so that new public and private keys are used to produce cryptographic signatures. Other actions that may be taken when an attack is detected may include alerting the driver, discarding the detected objects from the hacked object detector and rely on other safe object detectors, alerting the vehicle manufacturer about the compromised object detector, relying on the inputs from the connected infrastructure, not passing the detected object detectors to the other vehicle control modules, or other countermeasures/responsive actions. Method 900 may then end.

If method 900 determines that the signature verification was successful at step 904, method 900 continues to step 910 and includes determining the localized output. For example, the controller determines that an unauthorized modification did not occur, and that localized output coordinates [X, Y, W, H, P] may be used to determine a location of a bounding box, such as a bounding box marking a location of a detected object.

At step 912, method 900 includes taking an encrypted and cryptographically signed classified output as an output of the object detection algorithm of FIG. 7. For example, the cryptographically signed classified output at 912 may be the cryptographically signed classified output 740 of FIG. 7, and may be a cryptographically signed and encrypted output describing a class C of the object.

At step 914, method 900 includes verifying the encrypted classified output via a public key (e.g., signature verification) (shown in FIG. 9 as "Public Key 2"). For example, using a second public key stored in WPM, the cryptographic signature may be verified in order to determine whether the cryptographic signature is valid.

At step 916, method 900 includes determining whether the signature verification was successful at step 914. For example, if the controller determines that the cryptographic signature is valid at step 914, the signature verification is successful. Further, if the controller determines that the cryptographic signature is not valid at step 914, the signature verification is not successful.

If method 900 determines that the signature verification was not successful at step 916, method 900 continues to step 918 and includes determining that an object class attack may have occurred. In particular, if the controller determines that the signature verification is not successful, unauthorized modification of the classified output may have occurred. For example, an outside entity may have adjusted the classified output. The controller may determine not to use the classified output to adjust vehicle operation. Method 900 may then end.

At step 920, method 900 includes decryption of class C with a private key (shown in FIG. 9 as "Private Key 3"). For example, using the private key, the class C may be decrypted by the controller. The private key may be stored in RPMB, and may be provided by a vehicle manufacturer.

At step 922, method 900 determines whether the decryption of class C was successful. For example, not successfully decrypting class C may indicate that an unauthorized modification occurred, while success to decrypt class C may indicate that an unauthorized modification did not occur.

If method 900 determines that the decryption of class C was not successful at step 922, method 900 continues to step 918 and includes determining that an object class attack may have occurred. For example, if the decryption of class C is not successful, the controller determines that an unauthorized modification occurred, such that object class attacks occurred. Method 900 may then end.

If method 900 determines that the decryption of class C was successful at step 922, method 900 continues to step 924 and includes comparing the decrypted identification (ID) of the class C with a locally stored set of IDs. For example, class C is an ID associating the detected object with a class, such as a vehicle class, a pedestrian class, a traffic light class, and the like. Therefore, the decrypted class ID is compared with the stored class IDs which have been previously assigned to each object class during encryption. As such, an additional insertion of random class information may be detected, such as an unauthorized modification of the object class via inserting additional class ID information.

At step 926, method 900 includes determining the unencrypted classified output. For example, after decrypting the classified output, the controller may acquire the classified output (e.g., class C).

At step 928, method 900 includes passing the authentic and verified objects to a vehicle control system. For example, after successfully verifying each of the localized output and the classified output, the controller may obtain the bounding box location (X, Y), the bounding box size (W, H), the object probability (P), and the object class (C). The bounding box coordinates [X, Y, W, H, P, C] may be used to adjust vehicle controls. As an example, the bounding box coordinates may be used during autonomous vehicle operation in order to adjust vehicle operation based on the detected object. As another example, the bounding box coordinates may be used by a driver assistance system, such as a collision avoidance system, to adjust vehicle operation based on the detected object. Both authentic verified localized output 910 and classified output 926 are passed into 928 (shown in FIG. 9 as "Pass the authentic and verified objects into autonomous driving perception"). Method 900 may then end.

In this way, an incidence of unauthorized modification of outputs of an object detection system of a vehicle may be reduced. The object detection system may include a neural network that takes sensor data (e.g., such as camera images) as an input, and outputs bounding box coordinates of a detected object and the corresponding classified object class. The bounding box coordinates and object classes may be used by one or more vehicle systems to adjust vehicle operation, such as one or both of an autonomous vehicle control system and a driver assistance system. For example, by providing a cryptographic mechanism at a fully connected layer of a neural network of the object detection system, outputs of the neural network may be cryptographically signed. For example, the localized output and the classified output may be cryptographically signed. The cryptographic signatures may be verified, so that unauthorized modifications of the bounding box coordinates and object classes may be detected. For example, if a controller of the vehicle determines that an unauthorized modification occurred, the controller may not use the output of the neural network to adjust vehicle operation. By enabling the controller to identify unauthorized modifications, a modified bounding box and object class may not be used to adjust vehicle operation. Overall, accuracy of the vehicle control systems, functional safety of vehicle, and customer satisfaction may be increased.

A technical effect of including a cryptographic mechanism in an object detection system of a vehicle is that an output of the object detection algorithm may be cryptographically signed, and the cryptographic signature may be verified by a controller of the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the telematics unit 30 described with reference to FIG. 1. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
   generating a cryptographic signature for an output of nodes of a fully connected layer of a neural network of an object detection system of a vehicle, the nodes of the fully connected layer comprising localization nodes and classification nodes, wherein:
      the output of the nodes of the fully connected layer of the neural network comprises a localized output corresponding to the localization nodes and a classified output corresponding to the classification nodes;
      the cryptographic signature comprises a first cryptographic signature for the localized output and a second cryptographic signature for the classified output;
      the cryptographic signature is generated within functionality of the nodes;
      the output at least partially describes a detected object; and
   responsive to verifying the cryptographic signature, adjusting vehicle operation based on the detected object;
   and further, wherein:
      the localization and classification node outputs are each weight matrices determined based on an output of a previous fully connected layer, a weight connecting neurons of the previous fully connected layer to the fully connected layer, and a bias of the fully connected layer;
      signing the localization node output with the first cryptographic signature comprises applying the first cryptographic signature to a first weight matrix of each localization node of the fully connected layer, wherein the first cryptographic signature is based on a first private key stored in replay-protected memory block (RPMB); and
      encrypting and signing the classification node output with the second cryptographic signature comprises encrypting a second weight matrix of each classification node of the fully connected layer based on a public key stored in write-protected memory (WPM) and then applying the second cryptographic signature to the encrypted second weight matrix, wherein the second cryptographic signature is based on a second private key stored in the RPMB.

2. The method of claim 1, wherein the localized output includes coordinates for both of a location of a bounding box of the detected object and a size of the bounding box of the detected object and the classified output includes an object class of the detected object.

3. The method of claim 1, wherein verifying the cryptographic signature includes verifying the first cryptographic signature for the localized output based on a first public key, the first public key further stored in the WPM of the vehicle.

4. The method of claim 3, further comprising, responsive to not verifying the cryptographic signature, not adjusting the vehicle operation based on the detected object; and
   outputting an error message to a user of the vehicle, or discarding the detected object from an object detector, or alerting a vehicle manufacturer, or not passing the detected object to another vehicle control module.

5. The method of claim 1, wherein the localized output is based on an output of a first plurality of nodes of the fully connected layer, and the classified output is based on an output of a second plurality of nodes of the fully connected layer.

6. The method of claim 1, further comprising:

to generate the encrypted cryptographic signature for the classified output, providing encryption within the classification nodes based on a third public key, the third public key stored in the WPM.

7. The method of claim 1, wherein the neural network is a You Only Look Once (YOLO) neural network.

8. The method of claim 1, wherein the neural network is one of a Spatial Pyramid Pooling (SPP) neural network, a Faster R-CNN (FRCN) neural network, a Region Proposal Network (RPN) neural network, Single Shot Detector (SSD), Deconvolutional Single Shot Detector (DSSD), and a RetinaNet, Deformable convolution networks.

9. A method, comprising:

inputting, at a vehicle, a camera image to a neural network of an object detection system of the vehicle, the neural network including a fully connected layer;

signing, within functionality of localization nodes comprising the fully connected layer, a localization node output with a first cryptographic signature;

encrypting and signing, within functionality of classification nodes comprising the fully connected layer, a classification node output with a second cryptographic signature;

processing each of the signed localization node output and the signed classification node output via an activation function, an output of the activation function including a localized output signed with the first cryptographic signature and a classified output signed with the second cryptographic signature, each of the localized output and the classified output at least partially describing a detected object;

verifying each of the first cryptographic signature and the second cryptographic signature based on at least one public key and at least one private key; and responsive to successfully verifying each of the first cryptographic signature and the second cryptographic signature, adjusting at least one vehicle control based on each of the localized output and the classified output;

and further, wherein:

the localization and classification node outputs are each weight matrices determined based on an output of a previous fully connected layer, a weight connecting neurons of the previous fully connected layer to the fully connected layer, and a bias of the fully connected layer;

signing the localization node output with the first cryptographic signature comprises applying the first cryptographic signature to a first weight matrix of each localization node of the fully connected layer, wherein the first cryptographic signature is based on a first private key stored in replay-protected memory block (RPMB); and encrypting and signing the classification node output with the second cryptographic signature comprises encrypting a second weight matrix of each classification node of the fully connected layer based on a public key stored in write-protected memory (WPM) and then applying the second cryptographic signature to the encrypted second weight matrix, wherein the second cryptographic signature is based on a second private key stored in the RPMB.

10. The method of claim 9, further comprising:

responsive to not successfully verifying each of the first cryptographic signature and the second cryptographic signature, not adjusting the at least one vehicle control based on each of the localized output and the classified output, and outputting an error message to a user of the vehicle and/or discarding the detected object from an object detector and/or alerting a vehicle manufacturer and/or not passing the detected to another vehicle control module.

11. The method of claim 9, wherein the classified output provides a class of the detected object, the class including one of a pedestrian class, a vehicle class, a traffic light class, and a sign class and wherein the localized output provides coordinates for a location of a bounding box, a size of the bounding box, and a probability of the bounding box.

12. A system, comprising:

a vehicle system;

a vehicle control system including at least one of an autonomous vehicle control system and a driver assistance system;

a plurality of sensors communicatively coupled to the vehicle control system, the plurality of sensors including at least one camera;

an object detection system including a neural network, the neural network taking camera images from the at least one camera as an input and outputting coordinates corresponding to a bounding box of a detected object as an output, wherein the output is cryptographically signed with a cryptographic signature generated inside nodes of a fully connected layer of the neural network, nodes of the fully connected layer comprising localization nodes and classification nodes, the output of the nodes of the fully connected layer of the neural network comprises a localized output corresponding to the localization nodes and a classified output corresponding to the classification nodes, wherein the cryptographic signature comprises a first cryptographic signature applied to the localized output that is not encrypted and a second cryptographic signature applied to the classified output that is encrypted, wherein:

the localized output and the classified output are weight matrices determined based on an output of a previous fully connected layer, a weight connecting neurons of the previous fully connected layer to the fully connected layer, and a bias of the fully connected layer;

the localized output is signed with the first cryptographic signature comprises applying the first cryptographic signature to a first weight matrix of each localization node of the fully connected layer, wherein the first cryptographic signature is based on a first private key stored in replay-protected memory block (RPMB); and signing and encrypting the classified output with the second cryptographic signature comprises encrypting a second weight matrix of each classification node of the fully connected layer based on a public key stored in write-protected memory (WPM) and then applying the second cryptographic signature to the encrypted second weight matrix, wherein the second cryptographic signature is based on a second private key stored in the RPMB; and a controller storing executable instructions in non-transitory memory that, when executed, cause the controller to:

responsive to verifying the cryptographic signature of an output of the neural network, adjust at least one of the autonomous vehicle control system and the driver assistance system based on the output.

13. The system of claim 12, wherein the controller includes further executable instructions stored in non-transitory memory that, when executed, cause the controller to:

responsive to not verifying the cryptographic signature of the output of the neural network, not adjust the autonomous vehicle control system and the driver assistance system based on the output; and output an error message indicating an unauthorized modification to the object detection system.

14. The system of claim 12, wherein neural network takes data from a plurality of additional sensors as an input in addition to images from the at least one camera, the plurality of additional sensors including a GPS sensor, a Lidar sensor, a radar sensor, and an ultrasonic sensor.

15. The system of claim 12 wherein the neural network is a YOLO neural network including a plurality of convolutional layers, a first fully connected layer, a second fully connected layer, the weight matrices, and a leaky rectified linear unit (ReLU) activation function.

* * * * *